(12) United States Patent
Glennon et al.

(10) Patent No.: US 6,359,654 B1
(45) Date of Patent: Mar. 19, 2002

(54) METHODS AND SYSTEMS FOR DISPLAYING INTERLACED VIDEO ON NON-INTERLACED MONITORS

(75) Inventors: Stephen G. Glennon, Cedar Park; David A. G. Wilson, Austin, both of TX (US); Michael J. Brunolli, Escondido; Benjamin Edwin Felts, III, Cardiff, both of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 08/798,240

(22) Filed: Feb. 12, 1997

Related U.S. Application Data (60) Provisional application No. 60/011,656, filed on Feb. 14, 1996.

(51) Int. Cl.[7] .......................... H04N 7/01; H04N 11/20
(52) U.S. Cl. ................... 348/448; 348/458; 348/440
(58) Field of Search ................................. 348/448, 449, 348/454, 455, 456, 458, 459, 446, 445, 443, 441, 558, 556, 555, 543, 544, 545, 546, 576; H07N 7/01, 11/20, 7/20

(56) References Cited

U.S. PATENT DOCUMENTS

| | | | | |
|---|---|---|---|---|
| 4,426,661 A | * | 1/1984 | Okada et al. | 348/448 |
| 4,630,098 A | * | 12/1986 | Fling | 348/550 |
| 4,670,772 A | * | 6/1987 | Bolger | 348/450 |
| 4,673,981 A | * | 6/1987 | Loppman et al. | 348/441 |
| 4,698,674 A | | 10/1987 | Bloom | 358/140 |
| 5,097,257 A | | 3/1992 | Clough et al. | 340/814 |
| 5,117,289 A | * | 5/1992 | Farley et al. | 348/443 |
| 5,367,337 A | * | 11/1994 | Pyle et al. | 348/521 |
| 5,485,217 A | * | 1/1996 | Park | 348/448 |
| 5,504,531 A | * | 4/1996 | Knee et al. | 348/448 |
| 5,517,247 A | * | 5/1996 | Correa et al. | 348/448 |
| 5,621,470 A | * | 4/1997 | Sid-Ahmed | 348/448 |
| 5,646,094 A | * | 7/1997 | Horita et al. | 348/448 |
| 5,668,602 A | * | 9/1997 | Sid-Ahmed | 348/448 |
| 5,703,968 A | * | 12/1997 | Kuwahara et al. | 348/448 |
| 5,754,244 A | * | 5/1998 | Kahlman | 348/448 |
| 5,796,437 A | * | 8/1998 | Muraji et al. | 348/448 |

FOREIGN PATENT DOCUMENTS

| | | | | |
|---|---|---|---|---|
| EP | 0 444 341 A2 | 9/1991 | | H04N/5/44 |
| EP | 0 539 033 A1 | 4/1993 | | H04N/5/44 |
| EP | 0 639 029 A2 | 2/1995 | | H04N/5/44 |
| WO | WO 94/15435 | 7/1994 | | H04N/7/01 |

* cited by examiner

*Primary Examiner*—Andrew Faile
*Assistant Examiner*—Vivek Srivastava
(74) *Attorney, Agent, or Firm*—Jaquez & Associates; Martin J. Jaquez, Esq.

(57) ABSTRACT

A number of methods to display interlaced video on non-interlaced monitor are disclosed. One method is to display all of the incoming fields but one at a time, and correcting for the positional offset of one field relative to another in the interlaced data. An important aspect of the present invention is the correction of the positional offset of the two interlaced video fields. There are two ways presented to deal with the vertical offset of the two fields in accordance with the present invention. The first way is that the two fields can be displayed at different positions on the display using a non-interlaced display. The second way is that the video data can be altered to correct the positional offset between the fields. Another method of the present invention is to lock the frame rate of the output video to the incoming field rate or a multiple of the incoming field rate, or to certain sub-multiples of the incoming field rate. An important feature of this method is that each frame of the output monitor need not match the incoming field time precisely. As long as each output frame is displayed exactly the predetermined number of times, the appearance of smooth motion will be maintained.

18 Claims, 6 Drawing Sheets

| A<br>NTSC FIELD | B<br>FILM FRAME USED | C<br>TOTAL TIME FRAME TRANSMITTED (ms) | D<br>IMAGE CAPTURED | E<br>TOTAL TIME IMAGE DISPLAYED (ms) |
|---|---|---|---|---|
| 1 (ODD) | 1 | 50 | 1 | 66.6 |
| 2 (EVEN) | 1 | | | |
| 3 (ODD) | 1 | | 1 | |
| 4 (EVEN) | 2 | 33.3 | | |
| 5 (ODD) | 2 | | 2 | 33.3 |
| 6 (EVEN) | 3 | 50 | | |
| 7 (ODD) | 3 | | 3 | 33.3 |
| 8 (EVEN) | 3 | | | |
| 9 (ODD) | 4 | 33.3 | 4 | 33.3 |
| 10 (EVEN) | 4 | | | |
| 11 (ODD) | 5 | 50 | 5 | 66.6 |
| 12 (EVEN) | 5 | | | |
| 13 (ODD) | 5 | | 5 | |
| 14 (EVEN) | 6 | 33.3 | | |
| 15 (ODD) | 6 | | 6 | 33.3 |
| 16 (EVEN) | 7 | 50 | | |
| 17 (ODD) | 7 | | 7 | 33.3 |
| 18 (EVEN) | 7 | | | |
| 19 (ODD) | 8 | 33.3 | 8 | 33.3 |
| 20 (EVEN) | 8 | | | |
| 21 (ODD) | 9 | 50 | 9 | 66.6 |
| 22 (EVEN) | 9 | | | |
| 23 (ODD) | 9 | | 9 | |
| 24 (ODD) | 10 | 33.3 | | |
| 25 (EVEN) | 10 | | 10 | 33.3 |
| 26 (ODD) | 11 | 50 | | |
| 27 (EVEN) | 11 | | 11 | 33.3 |
| 28 (ODD) | 11 | | | |

METHODS AND SYSTEMS FOR DISPLAYING INTERLACED VIDEO ON NON-INTERLACED MONITORS

CROSS-REFERENCE TO RELATED PROVISIONAL APPLICATION

This application claims the benefit of U.S. Provisional Application, Ser. No. 60/011,656, filed on Feb. 14, 1996.

FIELD OF THE INVENTION

The present invention relates to computer display systems, and particularly to methods and systems for displaying interlaced video on monitors which are non-interlaced.

BACKGROUND OF THE INVENTION

Until now there have been two commonly used simple methods for displaying interlaced video being fed into the computer system on a computer monitor. These are normally independent of whether the computer monitor is interlaced or not, as even when the monitor is interlaced it normally refreshes at a rate independent of the incoming video signal.

Throughout this description NTSC video is assumed for the sake of illustrative examples, with references to 240 line fields, 480 line frames, 60 fields per second and 30 frames per second. This does not restrict the invention to NTSC or the line counts or frame or field rates but is merely used for simplicity. The invention is equally applicable to other video standards such as, but not limited to, PAL with 288 line fields, 576 line frames, 50 fields per second and 25 frames per second.

The first method is just capturing one of the two fields, and displaying 240 lines scaled (interpolated) up to 480 or however many are in the current display mode. The special case of scaling to 480 lines (line doubling) is currently used in the art and is well documented. See pages 332–333 of "Video Demystified: a Handbook for the Digital Engineers" by Keith Jack, HighText Publication Inc., 1993 (referred to herein as "Keith Jack").

The second method is to perform simple de-interlacing where both fields are captured into a single 480 line buffer and double the buffer line length for a single field in order to store a field in every other line. This is referred to as "Field Merging" (see p. 333 of Keith Jack)

(1) Deinterlacing by interleaving two fields into a single buffer

This method is fine in theory and provides better vertical resolution than a single field 240 line capture, but gives very objectionable results when viewing video with rapid horizontal action (for example a football game), as noted in page 333 of Keith Jack.

Figure 1:
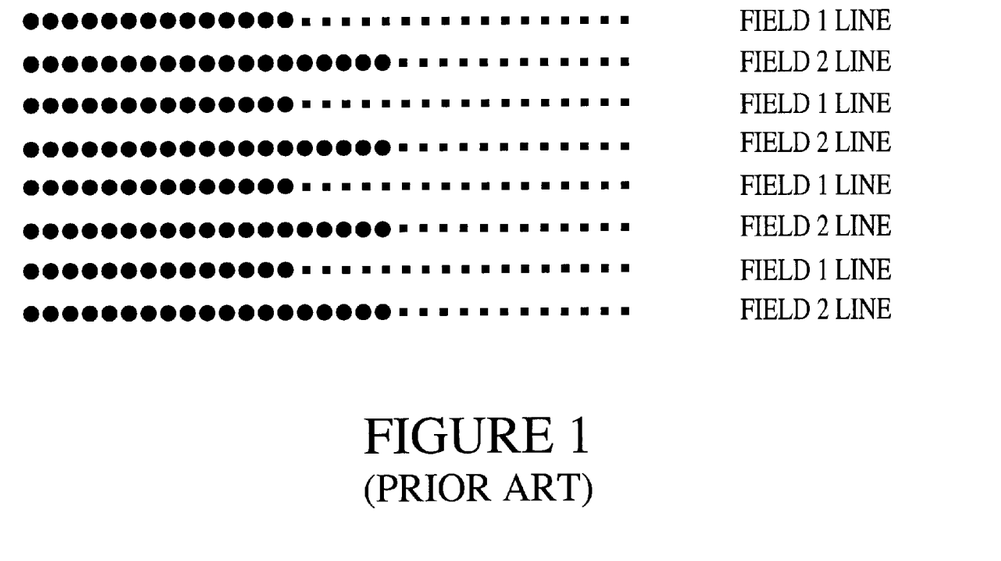
FIG. 1 shows a prior art method of deinterlacing by interleaving two fields into a single buffer.

As the two fields of a single video image are separated in time by 1/60th of a second, storing the later field interweaved into the same buffer results in a image with a zipper like appearance along high contrast vertical edges when rapid horizontal motion takes place in the source video. This effect is illustrated in FIG. 1 of the present application. Page 335, FIG. 7 of Keith Jack uses a picture of a flying bird to illustrate this artefact.

Figure 2:
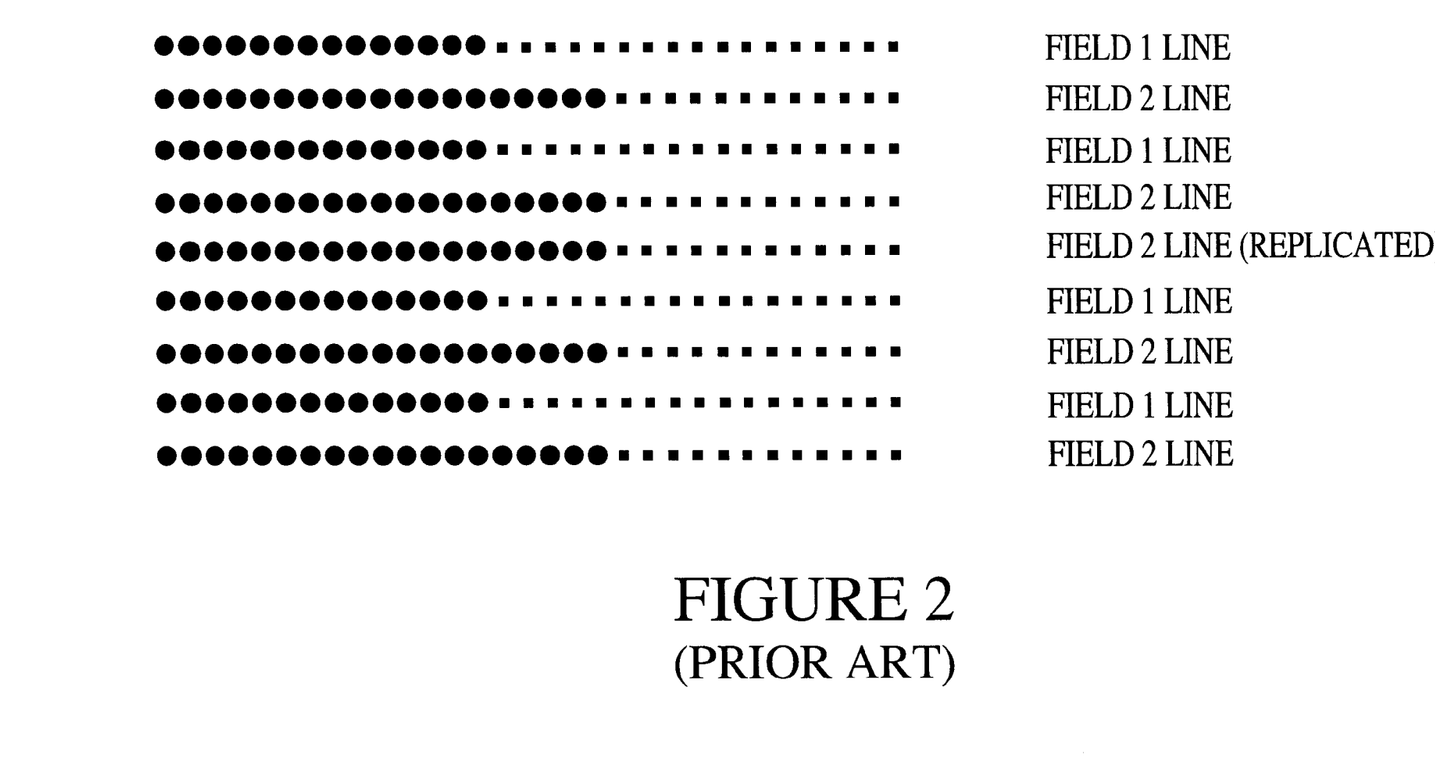
FIG. 2 shows another prior art method of deinterlacing by interleaving two fields into a single buffer.

Another problem to compound these line to line zipper like artefacts occurs when one needs to scale the resulting 480 line video up to different sizes. When one scales up by line replication, at certain points in the vertical scaling it is necessary to display one of the lines twice. If the image already has a repetitive left-right-left-right-left-right offset on vertical edges, replicating a single line introduces what appears as another break in the video. The effect can be seen in FIG. 2.

These breaks appear in a regular pattern, dictated by the scaling factor used to scale up from 480 lines to the destination size (for example 600 or 768 lines).

Pages 333–336 of Keith Jack refer to advanced techniques requiring detection of motion between fields on a pixel by pixel basis requiring the storage of 4 fields. This processing on a pixel by pixel basis would typically be expensive to implement because of the requirement for storing 4 fields and attempting to compare and process pixels from two fields to generate each output pixel.

Vertical interpolation can help to reduce this second artefact by attempting to interpolate between the lines from the two fields, but still does not give visually pleasing results.

(2) Displaying a single field per frame

Displaying a single field from a frame has an advantage, but some definite problems. The advantage is that there are none of the artefacts described above relating to the interleaving of two time-separated fields into a single buffer. There are three main problems. The first problem is that the image generated is fundamentally lower resolution vertically, coming from only 240 lines. Keith Jack refers to this when discussing "Scan Line Duplication" and "Scan Line Interpolation," indicating that although the number of lines is doubled, the vertical resolution is not increased from the original data (see pages 332–333 of Keith Jack). In addition, Keith Jack only deals with displaying on a 480 line display where the number of lines is exactly doubled. Further, Keith Jack only considers displaying a single field because it does not consider the differing spatial aspects of odd and even fields in an interlaced video source.

The second problem is that the image only changes 30 times per second, whereas the source interlaced data changes 60 times per second. Thirty frames per second is often considered "full motion video," indicating that it is good enough to fool the human eye into perceiving smooth motion. However, performing a side by side comparison of 30 and 60 frame per second video makes it apparent that 60 frames per second is noticeably smoother.

Figure 3:
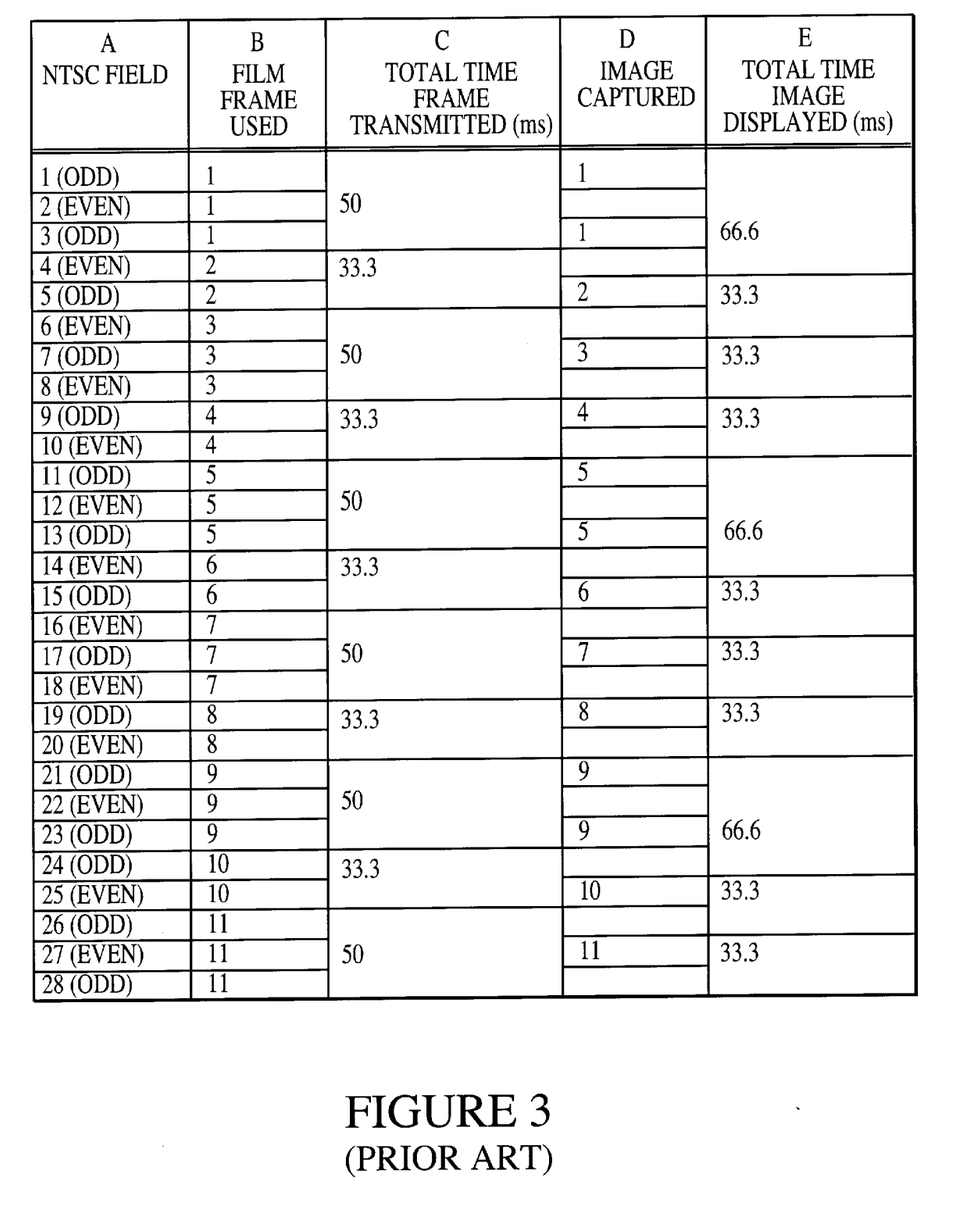
FIG. 3 shows a prior art method of displaying a single field per frame.
Figure 4:
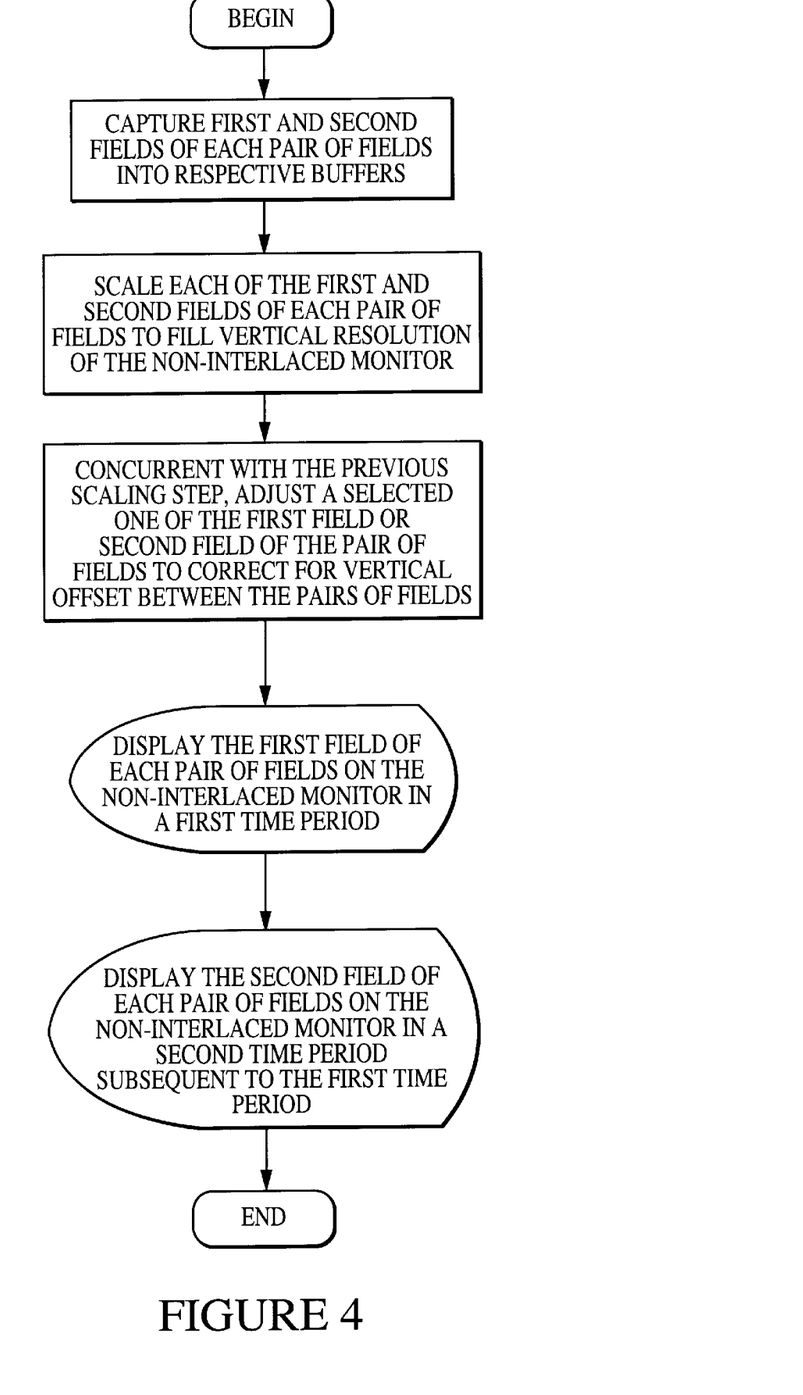
FIG. 4 is a flowchart of one embodiment of the present inventive method for displaying interlaced video data on a non-interlaced monitor.
Figure 5:
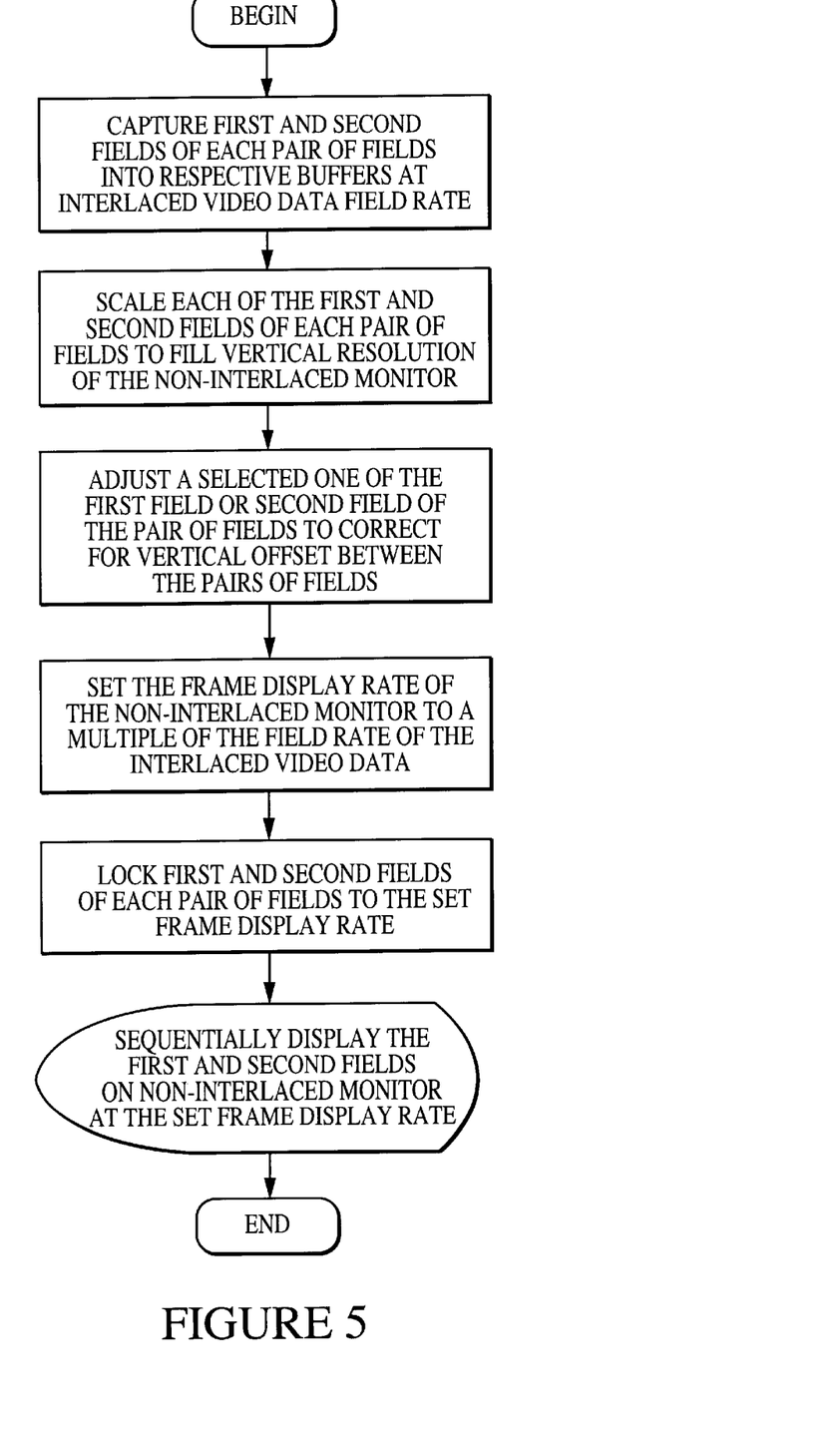
FIG. 5 is a flowchart of another embodiment of the present inventive method for displaying interlaced video data on a non-interlaced monitor.
Figure 6:
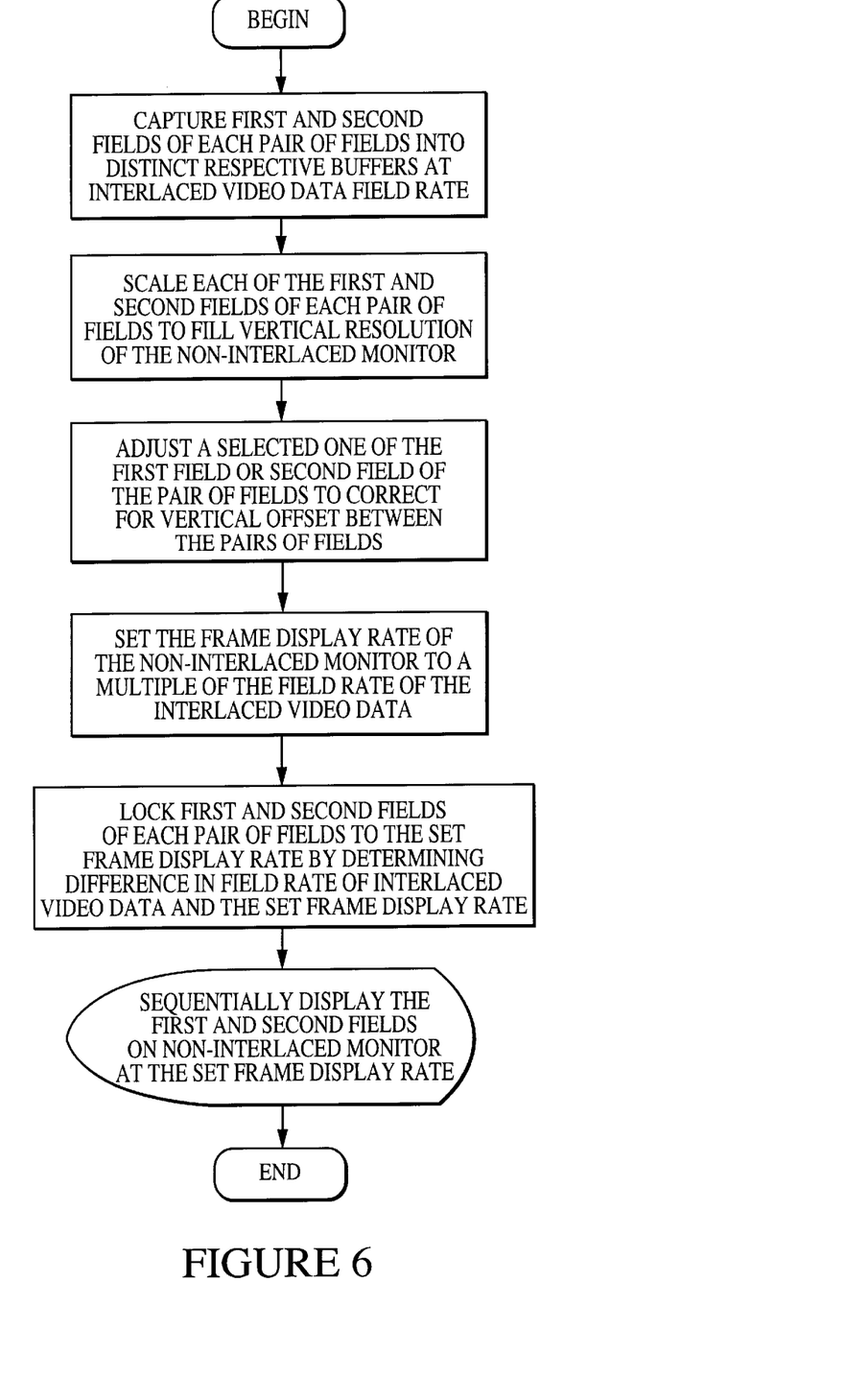
FIG. 6 is a flowchart of yet another embodiment of the present inventive method for displaying interlaced video data on a non-interlaced monitor.

The third problem is that displaying a single field at a rate of 30 fields per second interferes with 3:2 pull down commonly used to transmit films shot at 24 frames per second on an NTSC signal at 60 fields per second. With 3:2 pull down, a single film frame is transmitted for either two or three NTSC fields in order to approximate to the nominal 30 frames per second of NTSC. FIG. 3 shows the relationship of the film, the transmitted NTSC fields, and the images displayed on the computer screen.

It can be seen from column C of FIG. 3 that on a conventional TV the successive frames are displayed for 50 ms, 33.3 ms, 50 ms, 33.3 ms, 50 ms, and so on. This rapid alternation between two display times which differ by a factor of 1.5 gives a good impression of smooth motion on a conventional TV.

From column E of FIG. 3, it can be seen that using and displaying a single field results in the successive frames being displayed for 66.6, 33.3, 33.3, 33.3, 66.6 ms, and so on. Note that the period of the alternation between the short display time and the long display time is two times that of column C, and that the two display times differ by a factor of 2.

Summarizing, column E has a higher variability in the display time and a longer period in the variability. These two factors result in a noticeable jerkiness in the displayed images, particularly in smooth but rapid horizontal pans in the source film.

Note that in this simplistic analysis the effect of running the video monitor attached to the computer at a rate other than 60 Hz has been ignored. If the monitor is being refreshed at another frequency, (for example the commonly used 75 Hz), the artefacts introduced vary somewhat but the displayed images still show a fundamental jerkiness.

Pages 358–361 of Keith Jack address issues regarding field and frame rate conversion, but only for conversion from a computer monitor non-interlaced to TV interlaced, or from one interlaced standard to another. Keith Jack does not address frame rate conversion from interlaced (e.g., TV) to non-interlaced (e.g., computer monitor) systems. In addition, it refers to the "3:2 pull down" technique illustrated above in columns A and B (see its section on Field and Frame Rate Conversion of page 361 and FIG. 9.36 of page 365) for conversion from 24 frames per second film to 60 fields per second NTSC.

SUMMARY OF THE INVENTION

The following inventions describe ways of displaying interlaced video from sources such as MPEG 1, MPEG 2, Broadcast TV, Cable TV, Satellite TV, Direct Broadcast Satellite (PBS), Direct Satellite System (DSS), Video Tape Recorders (VTR's), LaserDisc, and any other sources of interlaced video, along with non-interlaced MPEG 1 video, on computer systems.

One method used in the present invention is to display all of the incoming fields but one at a time, and correcting for the positional offset of one field relative to another in the interlaced data. The method of doing this is to capture the two fields into separate buffers, one for the odd field and one for the even field. When one of the fields has been captured into the buffer, the buffer is displayed, scaled to the requested dimensions on the monitor using some scaling hardware or software. That image is displayed until the next field is captured into another buffer, and then the subsequent image is displayed until the third field is captured into either the original first buffer, or into another (third) buffer.

An important aspect of the present invention is the correction of the positional offset of the two interlaced video fields. There are two ways presented to deal with the vertical offset of the two fields in accordance with the present invention. The first way is that the two fields can be displayed at different positions on the display using a non-interlaced display. The second way is that the video data can be altered to correct the positional offset between the fields.

Another method of the present invention is to lock the frame rate of the output video to the incoming field rate or a multiple of the incoming field rate, or to certain sub-multiples of the incoming field rate. This is a much looser coupling of rates than conventional genlocking, and consequently can be implemented much more cheaply. All that is required to ensure that each field is displayed for the predetermined number of frame times on the output monitor. If the output frame rate is being made the same as the incoming field rate, then each field needs to be shown exactly once. This results in a frame rate of the output display of exactly the incoming field rate (59.94 hertz for NTSC, 50.00 hertz for PAL and SECAM). Similarly, for an output monitor rate of twice the incoming field rate, each field is displayed for exactly two output frames.

An important feature of this method is that each frame of the output monitor need not match the incoming field time precisely. As long as each output frame is displayed exactly the predetermined number of times, the appearance of smooth motion will be maintained.

These and other features of the present invention will become apparent from the following description when read in conjunction with the drawings and the appended claims.

DETAILED DESCRIPTION OF THE INVENTION

The present invention comprises a novel graphic display system and related methods. The following description is presented to enable any person skilled in the art to make and use the invention. Description of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

(1) Display All Fields

One feature of the present invention is to display all of the incoming fields but one at a time, and correcting for the positional offset of one field relative to another in the interlaced data. The method of doing this is to capture the two fields into separate buffers, one for the odd field and one for the even field. When one of the fields has been captured into the buffer, the buffer is displayed, scaled to the requested dimensions on the monitor using some scaling hardware or software. Typically, scaling can be achieved using line replication, line dropping, or a filtered scaling method such as interpolation.

That image is displayed until the next field is captured into another buffer, and then the subsequent image is displayed until the third field is captured into either the original first buffer, or into another (third) buffer.

The multiple buffering is to ensure that a video buffer is not being updated while it is being displayed, to avoid "tearing" (a horizontal discontinuity in the displayed data caused by the simultaneous display of part of one field and part of the following field)—a technique commonly known in the art and discussed in Keith Jack (see pages 358–359).

This method works well for MPEG 1 data which is 60 field per second, but is not actually interlaced, as each field being output by the MPEG 1 decoder is from the same vertical offset in the source image. However, for truly interlaced video odd fields and even fields are not from exactly the same place in the image. For truly interlaced video the odd and even fields are from positions one half a line different (vertically) in the original image. If the two fields are displayed "as is" in the same position on the output screen, it appears that the image is rapidly jiggling up and down. In order to display the fields in a way which eliminates this artefact, it is necessary to either display the odd and even fields in different positions on the display, or to alter the data before it is displayed to correct this vertical offset between the two fields.

An important aspect of the present invention is the correction of the positional offset of the two interlaced video fields. There are two ways presented to deal with the vertical offset of the two fields in accordance with the present invention.

(a) The two fields can be displayed at different positions on the display using a non-interlaced display.

The video data in each field consists of 240 lines of active data for NTSC video. If this is scaled up to twice that number of lines on the display, changing the position of scaled up image by a single line on the 480 line display effects a half line repositioning of the original 240 line image, correcting the half line offset of the two fields. One field is displayed at a particular line on the display, and the other field is displayed up one line or down one line on the display (whichever is appropriate for the correct repositioning of the other field—this depends on whether the first field is the odd or the even field).

Repositioning in this way gives the exactly correct repositioning when each field is scaled up by exactly a factor of 2. It is also possible to get exact repositioning when the fields are scaled up by a factor of 4 (by moving one of the fields 2 lines on the display), 6 (by moving one of the fields 3 lines on the display), or by any factor which is exactly divisible by 2. In the above example, a 480 line output monitor is considered but the invention is not limited to that monitor size.

It is possible and desirable to perform repositioning for other vertical scale factors, but the repositioning does not exactly correct for the vertical offset of the original fields. The repositioning should be performed whenever the resulting effective offset of the two fields is less than one half a line in the 240 line source data, as this gives visually more pleasing results than when the data is not adjusted, and has a positional error of 0.5 lines.

The above description applies to incoming NTSC field data which has not been scaled, but is not limited to this case. It is applicable to other field sizes (generated by other video standards such as PAL and SECAM), or when the field data is scaled vertically before being stored in the memory buffers. In these other cases, the output sizes would be determined by using the same scale up factors of 2, 4, 6 and so on.

The two fields can be scaled up using techniques including line replication and vertical interpolation. Vertical interpolation gives significantly better visible results than line replication, reducing apparent vertical "blockiness" of the displayed image, and smoothing angled lines in the video data which can have pronounced "stair step" appearance when line replication is used. Vertical interpolation should be used when scaling to factors which are not a multiple of 2, as line replication introduces additional visual artefacts in these cases.

Prior art methods do not consider repositioning alternate fields. As an example, even though Keith Jack discloses using deinterlacing with scan line interpolation, it does not consider the vertical offset of alternate video fields (see FIG. 9.4 on page 333). In addition, Keith Jack only considers producing two output lines for each input line, which would restrict the output monitor to displaying 480 lines for NTSC or 576 lines for PAL (having fields containing 240 active lines and 288 active lines respectively). This is highly undesirable in current situations where computer monitors are typically operated in modes with 600, 768, 1024 or 1200 lines.

(b) The video data can be altered to correct the positional offset between the fields.

It is possible to modify the video data to correct for the positional difference in the fields. In the simplest case, one of the fields can be re-sampled vertically such that the pixels of a displayed line are generated by averaging two vertically adjacent pixels from two lines. The resulting averaged pixel is effectively a pixel positioned half way between the two lines, thereby implementing a half line vertical repositioning.

This approach is very attractive, as it can be implemented for little or no additional cost on hardware which already has a vertical interpolator. All that is required is the ability to set the initial value of the vertical interpolator such that the first line it generates is 50% of the top line and 50% of the line after the top line. If the same vertical interpolator is used for both odd and even fields it is necessary to be able to alter the initial line behavior on a field to field basis, so that one field can be generated with the first line being 100% of the first line of the incoming data (that is, no vertical repositioning), and the other field being generated using 50% line 1 and 50% line 2 for the first stored/displayed line.

Although the description above in connection with the above described second way (i.e., the video data can be altered to correct the positional offset between the fields) has implied use of the vertical repositioning on the input (video capture) side of the hardware, it is applicable to both the input and the output paths. It is possible to perform the interpolative repositioning on the input path, before the video fields are stored in memory, or the video fields can be stored in memory unaltered and the hardware which scales the video on output can affect the interpolative repositioning.

In general, it is more desirable to perform the resampling on the output path for the following reason. If the data is resampled (but not scaled) on the input path, one of the fields will have had each of its lines generated by averaging two lines. This results in a certain amount of smoothing of the picture before the pixels are stored in the frame buffer memory. If this data in the frame buffer is then scale up for display (as is usually the case), then interpolative upscaling on the output path introduces further averaging (of two of the lines in the frame buffer) to generate an output line. This results in further smoothing. The two-pass smoothing can be detrimental to the quality of the output image, making it look much softer (with less detail) than a regular television picture.

If the resampling is performed purely on the output path by manipulating the initial phase of the output interpolator for one of the fields, then the each output line is generated by averaging two input lines a single time, giving a sharper image than the double averaging introduced by resampling on the input path and scaling on the output path.

Performing the resampling and upscaling on the input path is less desirable as the video field must be stored upscaled, thereby using more memory and potentially increasing the cost of the system.

In addition, if the resampling is to be performed on the output path it can be performed using whatever output resealing scheme is implemented in hardware. This can be (but is not limited to) schemes which vertically scale in the DAC, as the Brooktree BtV 2487 does, or schemes which scale by reading the unscaled data from memory and write it back to memory in the scaled size before the data is displayed. The Brooktree BtV 2487 is a commercially available integrated circuit.

A refinement of this vertical resampling scheme is to resample both fields such that the resulting two fields have the same effective spatial positioning, rather than resample just one of the fields. Performing the vertical resampling has the side effect that it smooths the image slightly. If only one of the fields is resampled then one field has been smoothed and the other has not. This may result in a visible disparity between the two fields when displayed. A scheme where both fields are resampled, but maintain the goal of having the same resulting position would be to resample one of the fields such that the first line output is 25% line one and 75% line two, and the other field is resampled such that the first output line is 75% line one and 25% line two. This still causes a half line repositioning of one output field relative to the other. This approach only adds benefit when the fields are to be shown unscaled (for example as 240 lines for NTSC) on the output monitor. In all other cases of upscaling both fields get smoothed by the upscaling operation (assuming interpolative upscaling) so the potential disparity in the smoothing is eliminated.

As discussed in the preceding paragraph, normal interpolation (averaging) of input lines to generate output lines results in some smoothing of the output image relative to the appearance on a normal television. Interpolation is preferable to line replication as line replication looks "blockier" than normal televisions, but the smoothing also degrades the visual quality slightly. A refinement of the vertical interpolation approach is to generate output lines by using three or more input lines and using a more complex filter which performs regular interpolation for smooth regions (low frequency changes in the vertical picture data), but enhances sharp changes in the picture vertically (high frequency changes in the vertical picture data). This kind of "sharpness filter" can be adjusted to provide the most visually pleasing result for the end viewer.

In addition to eliminating the jerkiness problems discussed above for displaying a single field out of each frame, this approach eliminates the problems of line to line "zippering" as described above for displaying both fields interleaved into a single buffer, and it results in video which had an apparently higher vertical resolution than displaying a single field vertically interpolated up to the output size.

(2) Dealing with Temporal Artefacts

Above was described one of the problems of jerkiness of displayed images when displaying only a single field per frame when the incoming video signal comes from film originally shot at 24 frames per second and re-sampled to be transmitted at 60 fields per second.

In the simplistic treatment above, only the capture rate (60 fields per second) was taken into account. However, one must also take the monitor refresh rate into consideration. Normally, computer monitors are operated at refresh rates of between 56 Hz and 85 Hz. Newer monitors ate often capable of refresh rates significantly in excess cf 85 Hz.

When the monitor refresh rate differs from the rate of the incoming video, it is necessary to use multiple buffers to capture and display the video fields, in order to avoid simultaneously updating and displaying a single buffer. If a memory buffer is simultaneously updated with incoming video data and displayed, the resulting displayed video typically has objectionable "tearing" artefacts where what is seen on the computer display is part of an old field for one portion of the display, and part of the new field for the rest of the display. Where there is rapid motion in the incoming video, the transition from the old field to the new shows up as a horizontal discontinuity in the displayed image (a horizontal "tear" in the image). Normally it is sufficient to make use of two buffers, one for the field being displayed on the monitor, and one for the field currently being captured. For reasons beyond the scope of this description it is necessary to use three buffers to avoid horizontal tearing under certain circumstances (such as when the image being displayed on the computer monitor does not fill the entire screen, and is displayed with the top edge being below the top edge of the screen).

Given the above treatment where multiple buffering is used to avoid horizontal tearing, each field of captured data is displayed for a multiple of display frame times (1 or more). This is currently the state of the art in displaying video on non-interlaced monitors. This approach leads to video with less smooth motion than is typically seen on a standard television, as without some guarantee of displaying at a frame rate locked to the field rate of the video, then some fields will be displayed for multiple display frame times, and some for a single frame time. This variability in the time a particular field is displayed for leads to an apparent jerkiness in the displayed video.

This inherent limitation of current implementations is circumvented by the following feature of the invention: Matching the display rate to the incoming video rate.

Genlocking is a technique known in the art for intimately synchronizing two interlaced video signals in order to allow video mixing and editing from multiple video sources. In genlocking, the finest details of the video signals are synchronized; the sync pulses, the pixel clocks and even the chrominance subcarrier clock. This technique is not applicable to a non-interlaced output display, where the video timings are fundamentally different from the incoming interlaced video signal: the lines cannot be synchronized as there are different numbers of lines between the interlaced field and the output monitor, and this precludes pixel clock synchronization. In addition, the RGB non-interlaced display monitors have no concept of a chrominance subcarrier clock.

One aspect of the present invention is to lock the frame rate of the output video to the incoming field rate or a multiple of the incoming field rate, or to certain sub-multiples of the incoming field rate. This is a much looser coupling of rates than genlocking, and consequently can be implemented much more cheaply. All that is required to ensure that each field is displayed for the predetermined number of frame times on the output monitor. If the output frame rate is being made the same as the incoming field rate, then each field needs to be shown exactly once. This results in a frame rate of the output display of exactly the incoming field rate (59.94 hertz for NTSC, 50.00 hertz for PAL and SECAM). Similarly, for an output monitor rate of twice the incoming field rate, each field is displayed for exactly two output frames.

Displaying at the same frame rate as the incoming field rate works extremely well when the non-interlaced output monitor has the same type of phosphors as a regular television, as the persistence of the phosphors is classed as "medium" and results in a non-flickering image when refreshed 60 times per second. However, most computer monitors are designed and built with "Short persistence" phosphors. This is because they are typically designed to be refreshed 75 times per second or more. For these monitors, it would seem that moving to twice the incoming field rate would be ideal. However, for NTSC, this would lead to a refresh rate of 119.88 hertz (hereafter simplified to 120 hertz). Most mid-priced computer monitors are not capable of being refreshed at that rate (normally being limited to at most 100 hertz), especially at larger resolutions such as 1024 pixels wide by 768 lines.

For these cases an acceptable compromise is to lock the monitor to 1.5 times the incoming field rate (approximately 90 hertz). In this case, alternate fields are displayed for exactly 1,2,1,2,1,2,1,2 etc. frame times. This rapid variation in the display time of each field can somewhat fool the human eye into seeing smooth motion. It is still a requirement to lock the rates such that the pattern of frame times is exactly maintained. If this is not done, then at some point the pattern may become 1,2,1,1,2,1,2,1 or 1,2,2,1,2,1,2,1,2 which would result in a visible jerk on certain video scenes containing motion.

An important feature of the invention is that each frame of the output monitor need not match the incoming field time precisely. As long as each output frame is displayed exactly the predetermined number of times, the appearance of smooth motion will be maintained. For example, the nominal field time of NTSC is 16.6833 milliseconds. The display frame time should be made to be very close to this time by the nature of this feature of the invention. However, if the output frame time is smaller than this value, then over a period of several frames the position of the output display refresh gun will drift relative to the position of the incoming video signal. As long as the cumulative error in the display time over a number of frames does not exceed the field time of the incoming video signal, each input field will be displayed once only. If the display frame time can be adjusted to longer than the field time for the incoming video signal, then the cumulative error can be corrected over a period of frames. Over time, the error will reduce to zero, and then accumulate as an error in the opposite direction. At this point, the output frame time should once again be adjusted to less than the incoming field time to correct the new cumulative error. As long as the errors are corrected before they accumulate to a whole frame time, each field will be displayed for single output frame.

There are two aspects to implementing this feature. The first aspect is the ability to adjust the monitor timing without causing a visible artefact on the display. The second aspect is the ability to sense the relative positions and drift in the positions of the video capture signal and the display signal.

There are three methods to achieve the first aspect (i.e., being able to adjust the monitor timing without causing a visible artefact on the display):

i) The preferred method for speeding up and slowing down the display is to remove or add pixels to the display lines in the vertically blanked region. The best place to add or remove pixels is as early in the blanking region as possible. This is because display monitors set their line and frame frequency from the incoming signals; if these signals change then the internal phase locked loop circuits in the monitors will lock onto the new frequencies. Making changes to the number of pixels in a line (changing the line frequency) early in the blanking allows the monitor's phase locked loop circuits to lock back to the normal line frequency before the active video is displayed.

ii) It is also possible to add or remove lines from the monitor's refresh, but this often causes vertical instability in the monitor's display when the line is added or removed. This instability is visible to viewer, making this approach less attractive.

iii) It is possible to adjust the frequency of the clock used to generate the output display to slow down or speed up the display. In this case it is important that the granularity of change is extremely fine such that the change does not cause the display to visibly alter in size or position. It is unusual to have sufficiently fine granularity to make this method viable.

Three methods are presented here as examples of ways to achieve the second aspect (i.e., being able to sense the relative positions and drift in the positions of the video capture signal and the display signal):

i) If it is possible to sense the position of one of the signals but not the other, one can determine the relative position of the two signals by sampling the available position at a fixed time in the refresh cycle of the other signal. Typically it is possible to generate a signal at a set time in either the display refresh cycle (most computer graphics systems can generate an interrupt at vertical retrace time) or in the incoming video circuitry (often through a frame complete interrupt). At the time of the interrupt the code samples the available position (often implemented as a line counter) and compares this to a similar value obtained from previous occasions. From this history, the system can determine the rate of drift and the relative positions of the signals and can adjust the output monitor timings to compensate.

ii) If two line counters are available, one for the input circuitry and one for the output circuitry, they can be sampled at the same time, and subtracted to determine a difference in position. Similarly to method (i) above, a history can be maintained and corrections made to the output timing as appropriate.

iii) If the input and output circuits are linked, then it is possible to implement a difference count, removing the need for subtraction as described in method (ii).

The invention has been described with reference to specific exemplary embodiments thereof Various modification and changes may be made thereunto without departing from the broad spirit and scope of the invention. The specification and drawings are, accordingly, to be regarded in an illustrative rather than a restrictive sense; the invention is limited only by the provided claims.

What is claimed is:

1. A method for displaying interlaced video data on a non-interlaced monitor, the interlaced video data comprising a plurality of paired fields, each pair of fields being vertically offset relative to each other by one-half of a field line spacing distance, each field comprising a plurality of lines of video data, the method including:

(a) capturing a first field and a second field of each pair of fields into respective buffers;

(b) scaling each of the first field and second field of each pair of fields to fill vertical resolution of the non-interlaced monitor;

(c) adjusting one of the first field or second field of the pair of fields to substantially correct for the vertical offset between the pairs of fields, where said adjusting is performed concurrently with said scaling;

(d) displaying the first field of each pair of fields on the non-interlaced monitor in a first time period; and (e) displaying the second field of each pair of fields on the non-interlaced monitor in a second time period subsequent to the first time period.

2. The method of claim 1, wherein scaling is achieved by line replication.

3. The method of claim 1, wherein scaling is achieved by line dropping.

4. The method of claim 1, wherein scaling is achieved by vertical interpolation between at least adjacent lines in the field being scaled.

5. The method claim 1, wherein the scaling step includes scaling to a size other than two times the size of the interlaced video data by interpolating the video data.

6. The method of claim 1, wherein the step of scaling is performed before the step of adjusting.

7. The method of claim 1, wherein the step of scaling is performed after the step of adjusting.

8. The method of claim 1, wherein the adjusting step includes changing display positions of one of the scaled first field or scaled second field by one or more lines on the noninterlaced monitor.

9. The method of claim 1, wherein the adjusting step is achieved by vertical interpolation between at least adjacent lines in the field being adjusted.

10. A method for displaying interlaced video data on a non-interlaced monitor, the interlaced video data comprising a plurality of paired fields and having a field rate, each field comprising a plurality of lines of video data, the non-interlaced monitor having a variable frame display rate and a maximum frame display rate, the method including:

(a) capturing a first field and a second field of each pair of fields into distinct respective buffers at the interlaced video data field rate;

(b) scaling each of the first field and second field of each pair of fields to fill vertical resolution of the non-interlaced monitor;

(c) adjusting one of the first field or second field of the pair of fields to substantially correct for the vertical offset between the pairs of fields;

(d) setting the frame display rate of the non-interlaced monitor to a multiple of the field rate of the interlaced video data, such that the set frame display rate is no greater than the maximum frame display rate of the non-interlaced monitor;

(e) locking the first field and the second field of each pair of fields to the set frame display rate, where said locking includes determining a difference in field rate of the interlaced video data and the set frame display rate of the displayed first field and second field by sampling an input line counter and an output line counter; and (f) sequentially displaying the first field and the second field on the non-interlaced monitor at the set frame display rate, such that each of the first field and second field are displayed for a predetermined number of frame times of the non-interlaced monitor.

11. The method of claim 10, wherein the set frame display rate is a sub-multiple of the field rate of the interlaced video data.

12. The method of claim 10, wherein the set frame display rate is a multiple of the field rate of the interlaced video data.

13. The method of claim 10, wherein the locking step includes the step of adding or removing one or more lines in a vertical blanking region of the interlaced video data.

14. The method of claim 10, wherein the locking step includes the step of increasing or decreasing the length of one or more lines in a vertical blanking region of the interlaced video data.

15. The method of claim 10, wherein the locking step includes the step of adjusting the frequency of a clock used to generate the set frame display rate.

16. The method of claim 10, wherein the locking step includes sensing drift in relative positions between lines in the interlaced video data and the displayed first field and second field.

17. The method of claim 10, wherein said locking includes determining a difference in field rate of the interlaced video data and the set frame display rate of the displayed first field and second field by use of a difference counter.

18. A method for displaying interlaced video data on a non-interlaced monitor, the interlaced video data comprising a plurality of paired fields and having a field rate, each field comprising a plurality of lines of video data, the non-interlaced monitor having a variable frame display rate and a maximum frame display rate, the method including:

(a) capturing a first field and a second field of each pair of fields into distinct respective buffers at the interlaced video data field rate;

(b) scaling each of the first field and second field of each pair of fields to fill vertical resolution of the non-interlaced monitor;

(c) adjusting one of the first field or second field of the pair of fields to substantially correct for the vertical offset between the pairs of fields;

(d) setting the frame display rate of the non-interlaced monitor to a multiple of the field rate of the interlaced video data, such that the set frame display rate is no greater than the maximum frame display rate of the non-interlaced monitor;

(e) locking the first field and the second field of each pair of fields to the set frame display rate, where said locking includes determining a difference in the field rate of the interlaced video data and the set frame display rate of the displayed first field and second field by sampling a line video position within at least one of the first field and second field at a consistent time in an output monitor display cycle; and (f) sequentially displaying the first field and the second field on the non-interlaced monitor at the set frame display rate, such that each of the first field and second field are displayed for a predetermined number of frame times of the non-interlaced monitor.

\* \* \* \* \*

Disclaimer

6,359,654 B1 — Stephen G. Glennon, Cedar Park, TX (US); David A. G. Wilson, Austin, TX (US); Michael J. Brunolli, Escondido, Cardiff, CA (US); Benjamin Edwin Felts, III, Cardiff, CA (US). METHODS AND SYSTEMS FOR DISPLAYING INTERLACED VIDEO ON NON-INTERLACED MONITORS. Patent dated March 19, 2002. Disclaimer filed January 20, 2016, by the assignee, Wi-Lan Inc.

Hereby disclaims complete claim 8 of said patent.

*(Official Gazette, March 29, 2016)*